United States Patent
Yang et al.

(10) Patent No.: US 12,248,060 B2
(45) Date of Patent: Mar. 11, 2025

(54) OBJECT IDENTIFICATION APPARATUS, VEHICLE, AND OBJECT IDENTIFICATION METHOD

(71) Applicant: Panasonic Intellectual Property Management Co., Ltd., Osaka (JP)

(72) Inventors: Yiming Yang, Kanagawa (JP); Hiroki Yamashita, Kanagawa (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 481 days.

(21) Appl. No.: 17/694,154

(22) Filed: Mar. 14, 2022

(65) Prior Publication Data
US 2022/0308199 A1  Sep. 29, 2022

(30) Foreign Application Priority Data
Mar. 25, 2021  (JP) .................................. 2021-051238

(51) Int. Cl.
  *G01S 13/86*  (2006.01)
  *G01S 13/931*  (2020.01)
  *G01S 15/931*  (2020.01)

(52) U.S. Cl.
  CPC .......... *G01S 13/862* (2013.01); *G01S 13/931* (2013.01); *G01S 15/931* (2013.01); *G01S 2013/93271* (2020.01); *G01S 2013/93272* (2020.01); *G01S 2015/937* (2013.01)

(58) Field of Classification Search
None
See application file for complete search history.

(56) References Cited

U.S. PATENT DOCUMENTS

| | | | | |
|---|---|---|---|---|
| 8,207,836 B2* | 6/2012 | Nugent | ............... | G01S 15/931 340/901 |
| 8,542,106 B2* | 9/2013 | Hilsebecher | .......... | G01S 13/931 340/436 |
| 8,558,733 B2* | 10/2013 | Kamo | .................... | G01S 13/42 342/70 |
| 10,048,355 B2* | 8/2018 | Lim | ....................... | G01S 13/34 |
| 11,009,603 B2* | 5/2021 | Kaino | .................. | G01S 13/931 |
| 2003/0001771 A1* | 1/2003 | Ono | ....................... | G01S 13/931 342/72 |

(Continued)

FOREIGN PATENT DOCUMENTS

| | | |
|---|---|---|
| JP | H06232819 A | 8/1994 |
| JP | H10239433 A | 9/1998 |

(Continued)

OTHER PUBLICATIONS

English Translation of Japanese Notice of Reasons for Refusal dated Jul. 2, 2024, for the corresponding Japanese Patent Application No. 2021-051238, 4 pages.

*Primary Examiner* — Peter M Bythrow
(74) *Attorney, Agent, or Firm* — Seed IP Law Group LLP

(57) ABSTRACT

An object identification apparatus includes: an identifier that identifies whether an object is a control target based on a result of comparison between reflection intensity of a detection wave and an identification threshold when the detection wave is received by the moving body; and a changer that changes identification sensitivity of the identifier according to positions of at least two points of the object when the detection wave is reflected at the at least two points and received by the moving body.

17 Claims, 7 Drawing Sheets

(56) References Cited

U.S. PATENT DOCUMENTS

| | | | |
|---|---|---|---|
| 2004/0183661 A1* | 9/2004 | Bowman | G08G 1/165 342/70 |
| 2008/0077327 A1* | 3/2008 | Harris | G01S 13/931 701/301 |
| 2009/0002222 A1* | 1/2009 | Colburn | G01C 9/00 342/146 |
| 2011/0221628 A1* | 9/2011 | Kamo | G01S 7/295 342/123 |
| 2013/0038484 A1* | 2/2013 | Ohkado | G01S 13/46 342/70 |
| 2013/0207833 A1* | 8/2013 | Mizutani | G01S 13/06 342/107 |
| 2013/0207834 A1* | 8/2013 | Mizutani | G01S 7/411 342/107 |
| 2014/0062762 A1* | 3/2014 | Kurono | G01S 7/354 342/146 |
| 2014/0292559 A1* | 10/2014 | Asanuma | G01S 13/345 342/133 |
| 2015/0309171 A1* | 10/2015 | Ishimori | B60W 30/0956 342/27 |
| 2016/0091603 A1* | 3/2016 | Aoki | G01S 13/931 342/70 |
| 2016/0124084 A1* | 5/2016 | Lim | G01S 13/931 342/160 |
| 2016/0245911 A1* | 8/2016 | Wang | G01S 7/2927 |
| 2017/0246990 A1* | 8/2017 | Rosenblum | G01S 15/931 |
| 2017/0363720 A1* | 12/2017 | Moriuchi | G01S 13/536 |
| 2017/0363738 A1* | 12/2017 | Kaino | G01S 13/584 |
| 2018/0348768 A1* | 12/2018 | Prasad | G05D 1/0257 |
| 2019/0285743 A1* | 9/2019 | Kaino | G01S 13/424 |
| 2021/0213962 A1* | 7/2021 | Pishehvari | G01S 13/89 |
| 2022/0065991 A1* | 3/2022 | Zhang | G01S 13/931 |
| 2022/0398851 A1* | 12/2022 | Nehmadi | G01S 17/931 |

FOREIGN PATENT DOCUMENTS

| | | |
|---|---|---|
| JP | 2012-247215 A | 12/2012 |
| JP | 5630377 B2 | 11/2014 |
| JP | 2021-051238 A | 4/2021 |

* cited by examiner

OBJECT IDENTIFICATION APPARATUS, VEHICLE, AND OBJECT IDENTIFICATION METHOD

TECHNICAL FIELD

The present disclosure relates to an object identification apparatus, a vehicle, and an object identification method.

BACKGROUND ART

There has been known an object identification apparatus capable of detecting an object based on an outgoing and reflected detection wave between a moving body, such as a vehicle, and an object. For example, Patent Literature 1 discloses a configuration where the reflection intensity of a detection wave is corrected according to the height of an object and the distance from a vehicle to the object, and the type of the object is identified by the corrected reflection intensity.

CITATION LIST

Patent Literature

PTL 1
JP 2012-247215 A

SUMMARY OF INVENTION

Solution to Problem

An object identification apparatus according to an embodiment of the present disclosure includes: a processor, which in operation, identifies whether an object is a control target based on a result of comparison between reflection intensity of a detection wave transmitted from a moving body to the object and an identification threshold when the detection wave is reflected by the object and received by the moving body, wherein, the processor changes identification sensitivity of the processor according to positions of at least two points of the object when the detection wave is reflected at the at least two points and received by the moving body.

A vehicle according to an embodiment of the present disclosure includes: an object identification apparatus comprising a processor, which in operation, identifies whether an object is a control target based on a result of comparison between reflection intensity of a detection wave transmitted from a moving body to the object and an identification threshold when the detection wave is reflected by the object and received by the moving body, wherein, the processor changes identification sensitivity of the processor according to positions of at least two points of the object when the detection wave is reflected at the at least two points and received by the moving body; a wave transmission sensor, which in operation, transmits the detection wave; and at least two wave reception sensors, which in operation, receive the detection wave.

An object identification method according to an embodiment of the present disclosure includes: identifying whether an object is a control target based on a result of comparison between reflection intensity of a detection wave transmitted from a moving body to the object and an identification threshold when the detection wave is reflected by the object and received by the moving body, wherein the identifying includes changing identification sensitivity according to positions of at least two points of the object when the detection wave is reflected at the at least two points and received by the moving body.

Advantageous Effects of Invention

According to an embodiment of the present disclosure, it is possible to stably identify an object.

DESCRIPTION OF EMBODIMENTS

Embodiment

Figure 1:
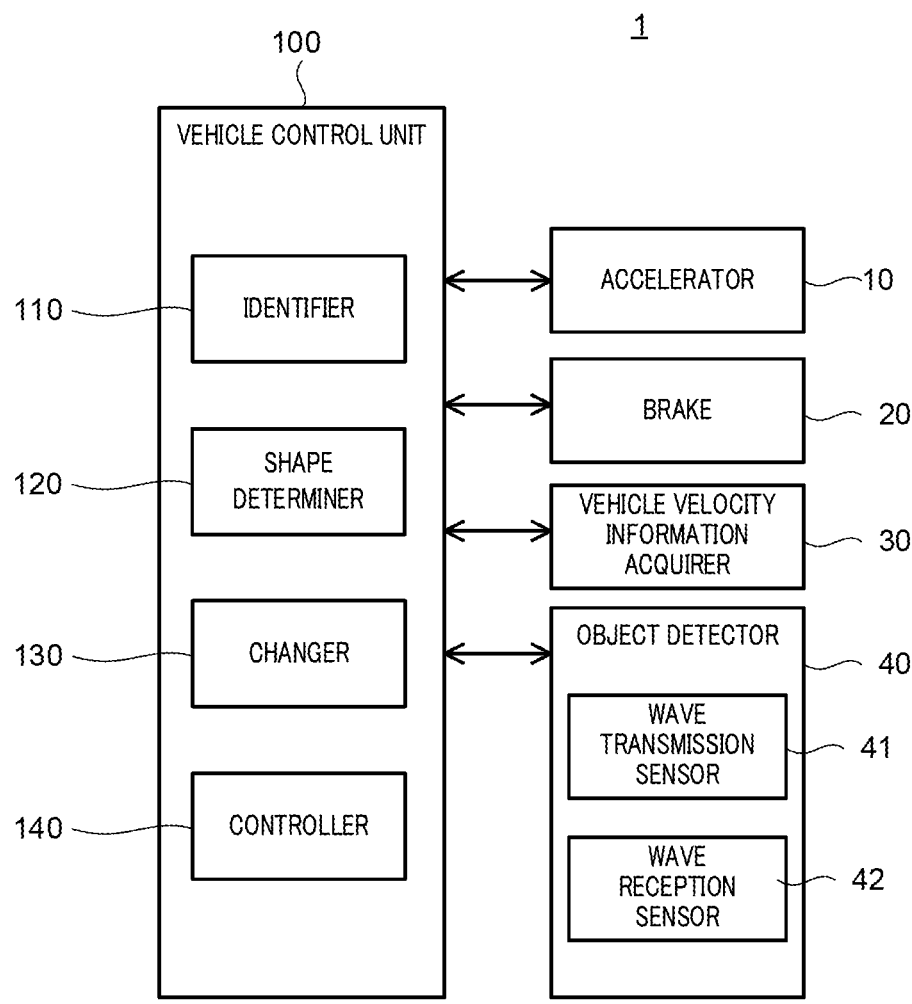
FIG. 1 is a block diagram illustrating an exemplary configuration of a vehicle to which a vehicle control unit according to an embodiment of the present disclosure is applied.

Hereinafter, embodiments of the present disclosure will be described in detail with reference to the accompanying drawings. FIG. 1 is a block diagram illustrating an exemplary configuration of vehicle 1 to which vehicle control unit 100 according to an embodiment of the present disclosure is applied.

As illustrated in FIG. 1, vehicle 1 is, for example, a moving body that has a function of identifying the risk of a collision between an object around a traveling route and vehicle 1. Vehicle 1 includes accelerator 10, brake 20, vehicle velocity information acquirer 30, object detector 40, and vehicle control unit 100.

Accelerator 10 is an acceleration device that accelerates or decelerates vehicle 1 according to an acceleration request from vehicle control unit 100.

Brake 20 is a braking device that brakes vehicle 1 according to a braking request from vehicle control unit 100.

Vehicle velocity information acquirer 30 acquires information on the velocity of vehicle 1. To be more specific, vehicle velocity information acquirer 30 acquires information on the vehicle velocity and acceleration of vehicle 1 from accelerator 10, for example, and acquires information on braking from brake 20, for example. Vehicle velocity information acquirer 30 also acquires information on the steering angle, for example, from an operator (not illustrated) such as a steering.

Object detector 40 is, for example, an in-vehicle sensor such as a sonar and a radar, and detects an object around a traveling route of vehicle 1 by transmitting a detection wave such as an ultrasonic wave and a millimeter wave (electromagnetic wave) and receiving the detection wave reflected by the object. Object detector 40 is provided at the front end or back end of vehicle 1, and includes wave transmission sensor 41 and two wave reception sensors 42, for example.

Figure 2:
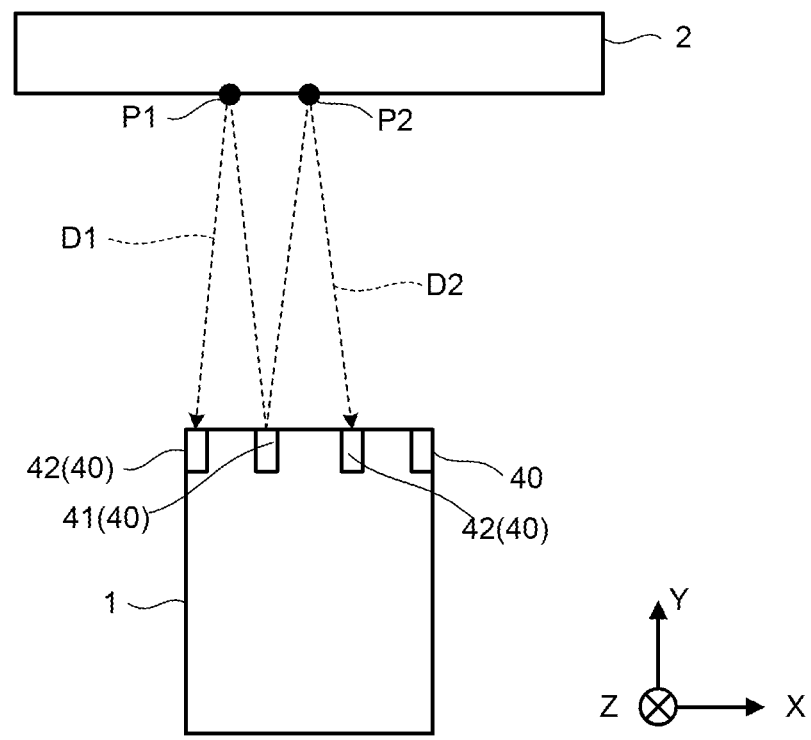
FIG. 2 illustrates an exemplary layout of object detectors in the vehicle.

FIG. 2 illustrates an exemplary layout of object detectors 40 in vehicle 1. Note that the Cartesian coordinate system (X, Y, Z) will be used in the following description. Figures to be described later use the common Cartesian coordinate system (X, Y, Z). For example, direction X indicates a right-left direction of vehicle 1, direction Y indicates a front-back direction of vehicle 1, and direction Z indicates an up-down direction (height direction) of vehicle 1.

As illustrated in FIG. 2, for example, object detector 40 includes four sensors on the positive end in direction Y of vehicle 1: one each on the both ends in direction X and two in the middle section in direction X. Wave transmission sensor 41 is, for example, a sensor provided on the negative side among the two sensors in the middle section in direction X. Wave reception sensors 42 are, for example, a sensor provided on the negative end in direction X and a sensor provided on the positive side among the two sensors in the middle section in direction X.

Wave transmission sensor 41 is a sensor that transmits a detection wave. In a case where wave transmission sensor 41 is a sonar, for example, wave transmission sensor 41 generates ultrasonic waves (detection waves) with the same frequency by applying a voltage of a predetermined frequency to piezoelectric elements, and transmits the detection waves. Note that wave transmission sensor 41 may be configured to be capable of receiving the transmitted detection waves.

Wave reception sensor 42 is a sensor that receives a detection wave reflected by object 2 after the detection wave is transmitted from wave transmission sensor 41. In a case where wave reception sensor 42 is a sonar, for example, wave reception sensor 42 converts a received detection wave to sound wave reception intensity (reflection intensity) by converting the sound pressure of the detected wave into a voltage using a piezoelectric element and rectifying the converted voltage. Note that wave reception sensor 42 may be configured to be capable of transmitting a detection wave.

The distance between vehicle 1 and object 2 can be calculated by measuring a traveling duration of the detection wave from wave transmission sensor 41 to wave reception sensor 42 via object 2. In addition, when the distance between vehicle 1 and object 2 is calculated, it is possible to calculate the coordinates of the position where the detection wave is reflected by object 2 based on the principle of triangulation.

Since two wave reception sensors 42 are provided, the detection wave transmitted from wave transmission sensor 41 is received at both of two wave reception sensors 42. The detection waves to be received at two wave reception sensors 42 return to wave reception sensors 42 via different routes D1 and D2 respectively.

On routes D1 and D2, the detection waves are respectively reflected at different positions P1 and P2 of object 2, and thus two sets of coordinates at positions P1 and P2 of object 2 can be calculated when the detection waves are received by two wave reception sensors 42. Note that object 2 illustrated in FIG. 2 is a wall with a plane parallel to direction X.

Returning to FIG. 1, vehicle control unit 100 is, for example, an electronic control unit (ECU), and includes a central processing unit (CPU), read only memory (ROM), random access memory (RAM), and input-output circuitry, which are not illustrated. Vehicle control unit 100 identifies whether an object around the traveling route is a control target (e.g., object that possibly collides with vehicle 1) based on a preconfigured program, and performs predetermined traveling control.

Vehicle control unit 100 includes identifier 110, shape determiner 120, changer 130, and controller 140. Identifier 110, shape determiner 120, and changer 130 correspond to an "object identification apparatus" of the present disclosure.

When a detection wave transmitted to an object from vehicle 1 is reflected by the object and received by vehicle 1, identifier 110 identifies whether the object is a control target based on a result of comparison between the reflection intensity of the detection wave and an identification threshold.

To be more specific, when the reflection intensity based on the detection wave received by wave reception sensor 42 is equal to or greater than the identification threshold, identifier 110 identifies that the object is a control target. When the reflection intensity is less than the identification threshold, identifier 110 identifies that the object is a non-control target, which is not a control target. Note that, when wave transmission sensor 41 receives a transmitted detection wave, identifier 110 identifies whether the object is a control target based on the reflection intensity of the detection wave received by wave transmission sensor 41.

The identification threshold is a threshold serving as a criterion for identifying whether the object is a control target (obstacle) of vehicle 1 by being compared to the reflection intensity of the detection wave received by wave reception sensor 42. Identifier 110 identifies that the object is a control target when the reflection intensity is equal to or greater than the identification threshold.

Figure 3:
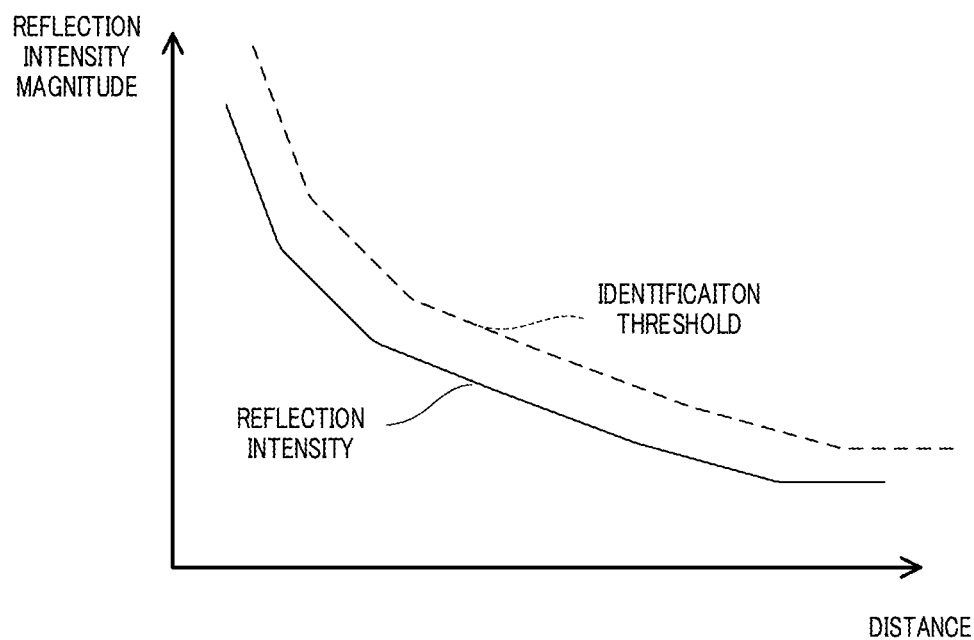
FIG. 3 is a chart for describing a general method of setting an identification threshold for reflection intensity.

Since the detection wave attenuates rapidly in the air, the longer the distance between vehicle 1 and the object is, the greater the attenuation is. That is, the longer the distance between vehicle 1 and the object is, the lower the reflection intensity based on the detection wave received by wave reception sensor 42 is, as illustrated in FIG. 3, for example. Thus, the identification threshold is generally set according to the reflection intensity so that the identification threshold is lower as the distance between vehicle 1 and the object is longer.

Figure 4:
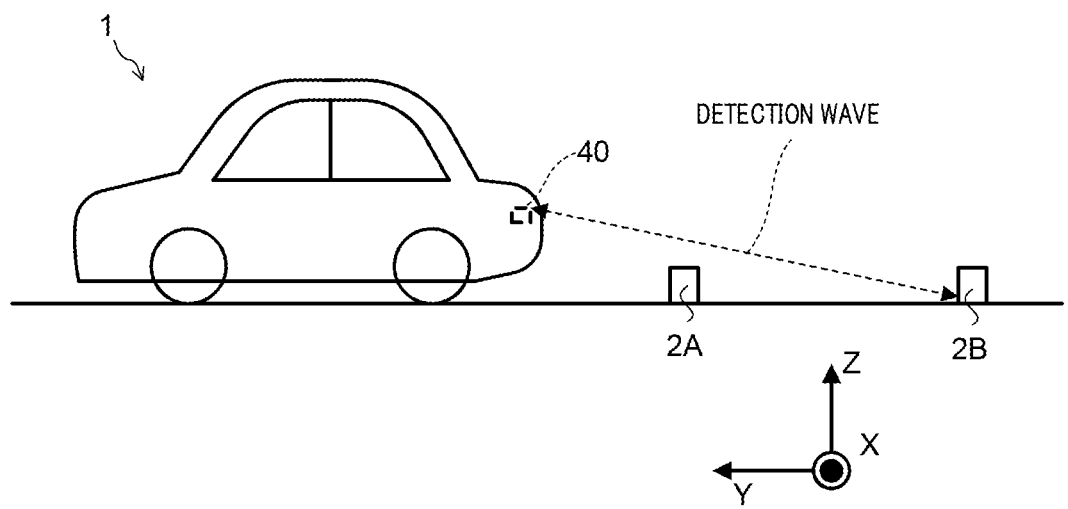
FIG. 4 is a diagram for describing a relation between lower objects and a detection wave.

In a case of a lower object such as a curb, however, the pattern of the change in the reflection intensity for the distance is different from that in FIG. 3 due to, for example, a relation between the angle of incidence and the angle of reflection of the detection wave. For example, when lower object 2A exists relatively close in distance with vehicle 1 as illustrated in FIG. 4, the detection wave transmitted from wave transmission sensor 41 is difficult to reach the position of lower object 2A; accordingly, the reflection intensity is low for lower object 2A at a position relatively close in distance.

In contrast, the reflection intensity is high for lower object 2B that exists relatively far in distance with vehicle 1 because the detection wave easily reaches lower object 2B and is easily incident on wave reception sensor 42 after being reflected by lower object 2B. To be more specific, as illustrated in FIG. 5, in the pattern of the change in the reflection intensity for distance, the reflection intensity gradually increases as the distance increases from a position far from vehicle 1 by distance T1, and after reaching the maximum value at distance T2, the reflection intensity gradually decreases.

Thus, the reflection intensity for a lower object exceeds the identification threshold in a case where the identification threshold is set so as to be lower as the distance increases as illustrated in FIG. 3. A lower object cannot be an obstacle since it is located on a road surface and has a height that does not cause collision with the body of vehicle 1; that is, a lower object is a non-control target. Emphasis on the reflection intensity possibly causes such a lower object to be identified as a control target. Note that FIG. 4 illustrates an example of objects (lower objects) located at the back of vehicle 1, but the same applies to an object located in front of vehicle 1.

Figure 5:
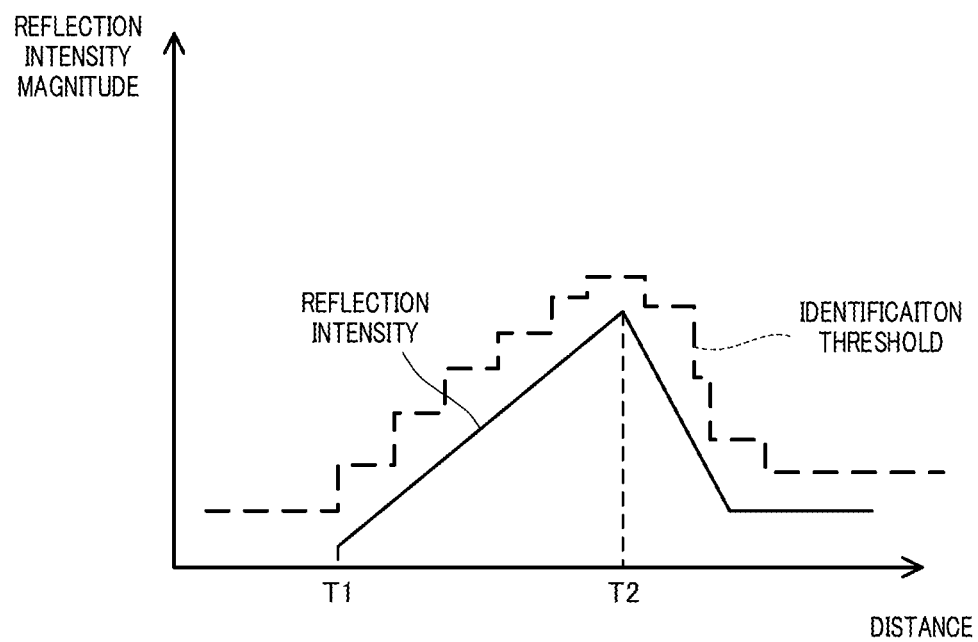
FIG. 5 illustrates exemplary change of the reflection intensity for a lower object with respect to distance.

With this regard, in the present embodiment, the identification threshold is set as the broken line illustrated in FIG. 5 so that the reflection intensity for a lower object does not exceed the identification threshold. To be more specific, the identification threshold is set so as to gradually increase from the position far from vehicle 1 by distance T1 to the position of distance T2 where the reflection intensity reaches the maximum value and then decreases as the distance from vehicle 1 decreases.

This prevents a lower object such as a curb from being identified as a control target (obstacle).

Shape determiner 120 determines the shape of an object based on two sets of coordinates of the object calculated by detecting the detection waves respectively propagated in different routes. To be more specific, shape determiner 120 determines whether the object is a pillar object based on the two sets of coordinates. The pillar object is, for example, a cylindrical object such as a pole provided on the edge of a road.

To be more specific, shape determiner 120 calculates a set of coordinates indicating a position where the detection wave has reached on the object based on the principle of triangulation from the distance between vehicle 1 and the object calculated by the outgoing and reflected detection wave.

Since two wave reception sensors 42 are provided as described above, shape determiner 120 calculates two sets of coordinates based on the detection waves respectively received by wave reception sensors 42. Shape determiner 120 then determines whether the object is a pillar object depending on the coordinate difference between the two sets of coordinates. To be more specific, shape determiner 120 determines that the object is not a pillar object when the coordinate difference is equal to or greater than a shape determination threshold, and determines that the object is a pillar object when the coordinate difference is less than the shape determination threshold.

The shape determination threshold is a threshold corresponding to a value of the coordinate difference when the two sets of coordinates are close to each other for a relatively thin object such as a pillar object, and is appropriately set according to the thickness of the pillar object. The shape determination threshold corresponds to a "predetermined threshold" of the present disclosure.

Figure 6:
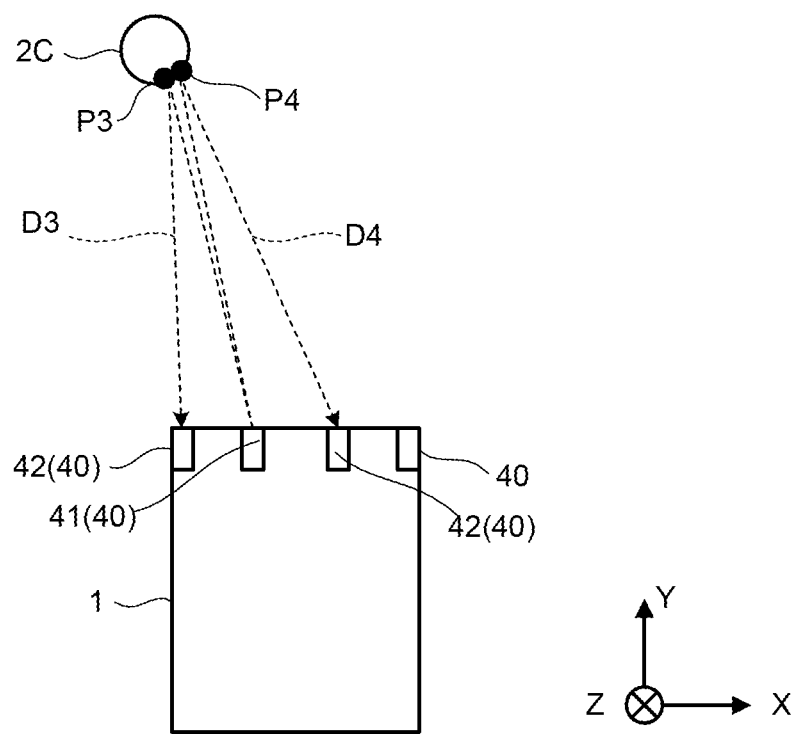
FIG. 6 illustrates exemplary routes of the detection wave in a case of a pillar object.

As illustrated in FIG. 6, pillar object 2C has a circumferential surface, and thus the detection waves are respectively reflected from two points P3 and P4 whose coordinate positions are close to each other to two wave reception sensors 42 via different routes D3 and D4.

Meanwhile, in a case of a non-pillar object (e.g., object 2 illustrated in FIG. 2, such as a wall with a plane parallel to direction X) other than pillar object 2C, the detection waves are respectively reflected from two points P1 and P2 whose coordinate positions are relatively far from each other to two wave reception sensors 42 via different routes D1 and D2.

A pillar object and a non-pillar object have a clear difference in the coordinate difference between the two sets of coordinates as described above, and it is thus possible to determine whether the object is a pillar object using the shape determination threshold as a reference. Further, the reflection intensity is affected by disturbances (wind, rain, heat, etc.) and the value easily fluctuates, whereas the coordinate difference is not easily affected by disturbances and it is possible to accurately determine whether the object is a pillar object.

The coordinate difference is indicated by the distance between at least X-direction components among the X-direction components and Y-direction components of two sets of coordinates. Note that the distance between the Y-direction components may be taken into account for the coordinate difference besides the X-direction components.

Figure 7:
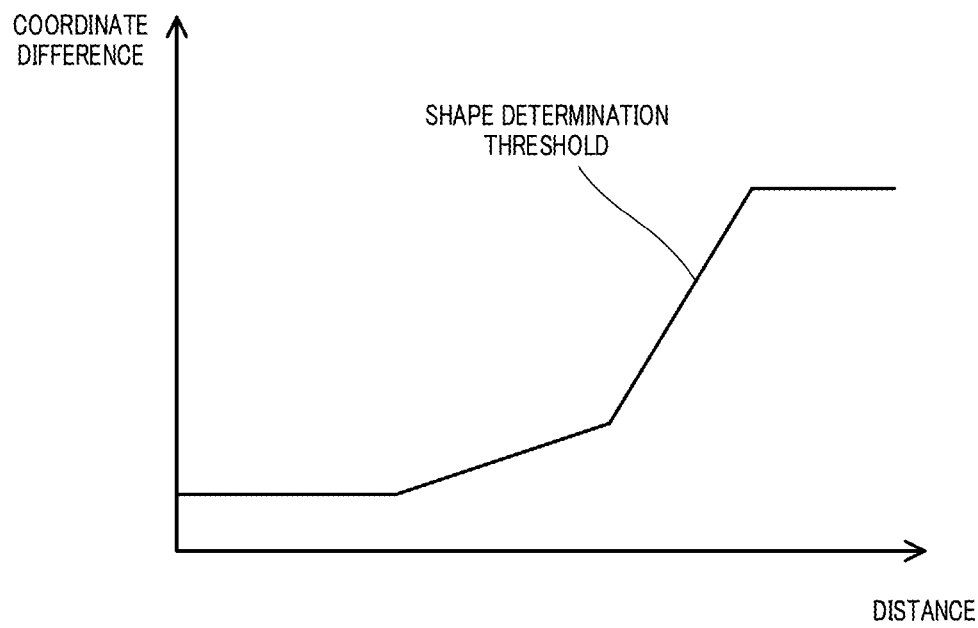
FIG. 7 illustrates an exemplary relation between a shape determination threshold and distance.

The calculated coordinate difference sometimes varies according to the distance between vehicle 1 and the object. In this case, the shape determination threshold may be variably set according to the distance between vehicle 1 and the object as illustrated in FIG. 7, for example. In the example illustrated in FIG. 7, the shape determination threshold is set so as to be greater as the distance between vehicle 1 and the object increases.

When vehicle 1 receives the detection waves reflected at two points of an object, changer 130 changes identification sensitivity of identifier 110, which identifies whether the object is a control target, according to the positions of the two points. To be more specific, changer 130 changes the identification threshold according to the coordinate difference between the two sets of coordinates. In other words, changer 130 changes the identification sensitivity by changing the identification threshold according to whether the object is a pillar object based on the determination result of shape determiner 120.

Figure 8:
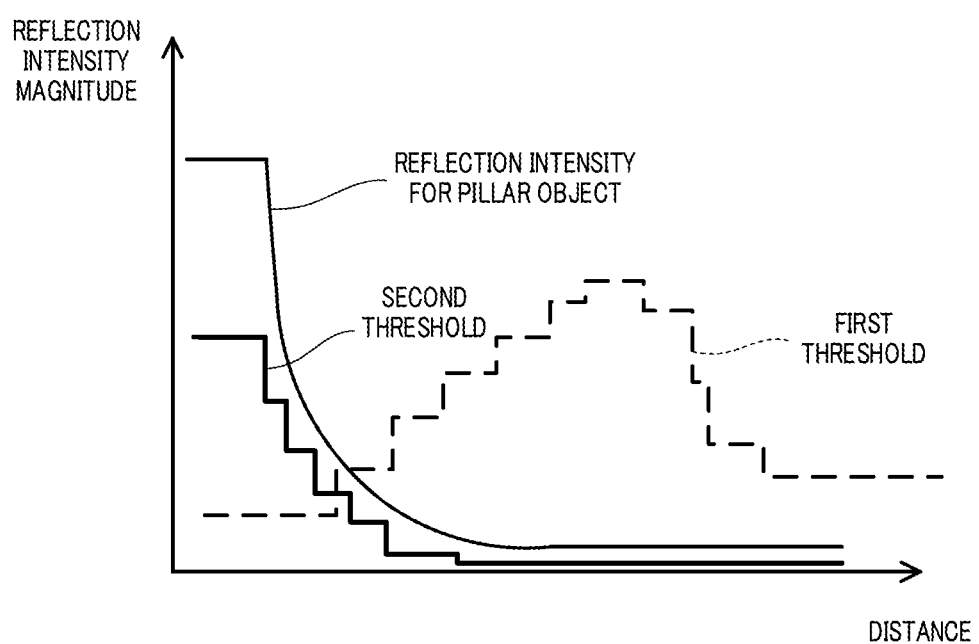
FIG. 8 illustrates an exemplary relation between the reflection intensity for a pillar object and an identification threshold.

As illustrated in FIG. 8, the identification threshold for a non-pillar object is set to the first threshold corresponding to a lower object such as a curb in the present embodiment. The first threshold is the above-described identification threshold illustrated in FIG. 5. That is, the identification threshold is set according to the reflection intensity of the detection wave for a non-control target when the coordinate difference between two sets of coordinates (distance between two points) is equal to or greater than the shape determination threshold.

A pillar object is erected on a road surface and has a certain height. Thus, unlike a lower object, the reflection intensity does not increase as the distance increases. The reflection intensity based on the detection wave for a pillar object decreases as the distance between vehicle 1 and the pillar object increases.

When the distance between vehicle 1 and the pillar object increases to some extent, the reflection intensity for the pillar object falls below the first threshold. This causes identifier 110 to identify the pillar object as a non-control target, which is not a control target.

Thus, changer 130 changes the identification threshold to the second threshold that corresponds to the reflection intensity for a pillar object when the object is a pillar object. As is the case with the reflection intensity for a pillar object, the second threshold decreases as the distance between vehicle 1 and the pillar object increases.

This allows identifier 110 to reliably identify a pillar object as a control target.

Further, changer 130 may determine whether to perform control of changing the identification threshold according to the distance between vehicle 1 and an object. The longer the distance between vehicle 1 and an object, the larger the error in calculated coordinates of the object, and this can easily affect the accuracy of pillar object determination.

Thus, changer 130 performs the above-described control of changing the identification threshold when the distance between vehicle 1 and an object is equal to or less than a predetermined distance. The predetermined distance is a range where some accuracy is ensured in calculating the coordinates of the object, for example, and is appropriately set according to the reflection intensity based on the detection wave of object detector 40.

This allows a pillar object to be identified as a control target within a range where the accuracy of pillar object determination is ensured.

Controller 140 predicts the possibility of collision between vehicle 1 and a control target based on, for example, the relative velocity of the control target resulting from the movement of the control target identified by identifier 110, and the movement (vehicle velocity information) of vehicle 1. Well-known techniques, for example, can be used for predicting the possibility of collision.

Controller 140 then outputs an acceleration request or a braking request according to the possibility of collision and the acceleration status of vehicle 1.

This enables appropriate traveling control such as control of a braking operation toward an accurately identified control target.

Figure 9:
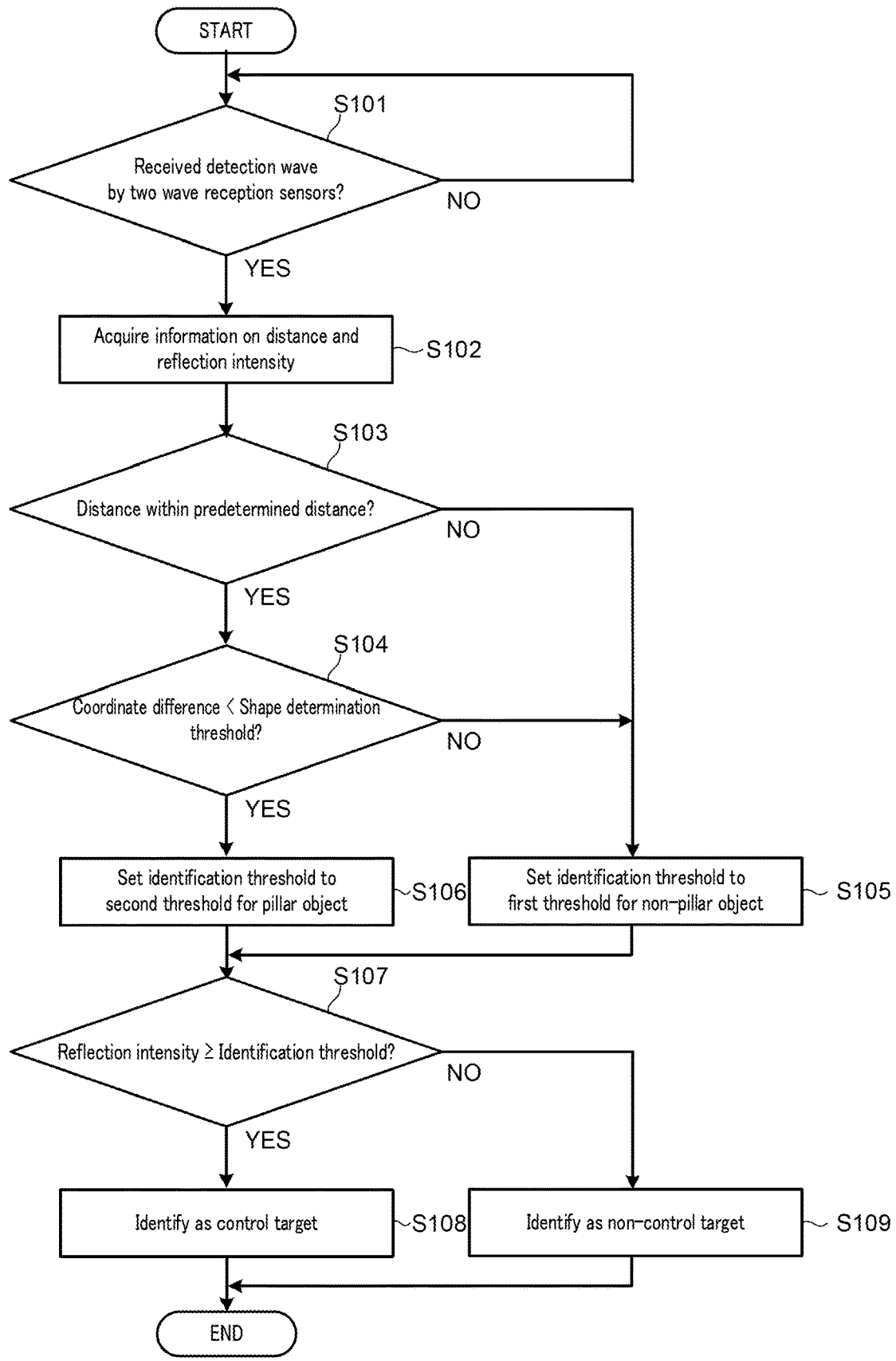
FIG. 9 is a flowchart describing an exemplary operation of identification control in the vehicle control unit.

A description will be given of an exemplary operation of identification control in vehicle control unit 100 configured as described above. FIG. 9 is a flowchart describing the exemplary operation of identification control in vehicle control unit 100. The processing in FIG. 9 is performed as appropriate when vehicle 1 travels, for example. In this flowchart, it is assumed that a detection wave is transmitted from wave transmission sensor 41.

As illustrated in FIG. 9, vehicle control unit 100 determines whether the detection waves are received by two wave reception sensors 42 (step S101). When it is determined that the detection waves are not received by two wave reception sensors 42 (NO in step S101), the process of step S101 is repeated.

Meanwhile, when the detection waves are received by two wave reception sensors 42 (YES in step S101), vehicle control unit 100 acquires the distance between vehicle 1 and the object and information on the reflection intensity of the detection waves (step S102).

Vehicle control unit 100 then determines whether the distance between vehicle 1 and the object is within a predetermined distance (step S103). When it is determined that the distance is greater than the predetermined distance (NO in step S103), the procedure proceeds to step S105.

Meanwhile, when the distance is within the predetermined distance (YES in step S103), vehicle control unit 100 determines whether the coordinate difference between the two sets of coordinates is less than a shape determination threshold (step S104).

When it is determined that the coordinate difference is equal to or greater than the shape determination threshold (NO in step S104), vehicle control unit 100 sets the identification threshold to the first threshold for a non-pillar object (step S105). Meanwhile, when the coordinate difference is less than the shape determination threshold (YES in step S104), vehicle control unit 100 sets the identification threshold to the second threshold for a pillar object (step S106).

After step S105 or step S106, vehicle control unit 100 determines whether the reflection intensity is equal to or greater than the identification threshold (step S107). When it is determined that the reflection intensity is equal to or greater than the identification threshold (YES in step S107), vehicle control unit 100 identifies the object as a control target (step S108).

Meanwhile, when the reflection intensity is less than the identification threshold (NO in step S107), vehicle control unit 100 identifies the object as a non-control target (step S109). This control is terminated after step S108 or step S109.

Note that vehicle control unit 100 performs predetermined traveling control on vehicle 1 after step S108.

According to the present embodiment configured as described above, the identification threshold is changed based on whether an object is a pillar object, thereby accurately identifying the pillar object as a control target.

In addition, the identification threshold (first threshold) is set according to the reflection intensity of a non-control target. This reliably prevents an object from being identified as a control target when the object is a non-control target.

That is, the present embodiment prevents misidentification of an object by utilizing the fact that the pattern of the change in the reflection intensity varies depending on the shape of the object. As a result, the present embodiment makes it possible to stably identify an object.

Further, the determination whether an object is a pillar object is based on the coordinate difference between two sets of coordinates. This prevents determination failure for the shape of the object caused by the effect of disturbance. As a result, the present embodiment makes it possible to determine the shape of an object accurately.

Furthermore, the determination whether to change identification sensitivity is based on the distance between vehicle 1 and an object, and it is thus possible to identify a pillar object as a control target within a range where the accuracy of pillar object determination is ensured, thereby achieving accurate determination of a pillar object.

Note that an identification threshold serves as the identification sensitivity and the identification threshold is changed in the embodiment described above, but the present disclosure is not limited to this. For example, the reflection intensity may serve as the identification sensitivity, and the reflection intensity may be changed instead of changing the identification threshold. In the case where the reflection intensity serves as the identification sensitivity, the reflection intensity is changed by changing the output pressure, such as the sound pressure, of a detection wave or the amplification of a detection wave.

To be more specific, changer 130 changes the reflection intensity so that the reflection intensity exceeds the identification threshold (first threshold) by increasing the output pressure of a detection wave or the amplification of a detection wave in a case where the object is a pillar object.

Such control also achieves stable object identification.

The embodiment described above uses a cylindrical object, such as a pole, as an example of a pillar object, but the present disclosure is not limited to this. Any pillar object may be used as long as the object can reflect a detection wave transmitted from wave transmission sensor 41 at two points of the object to two wave reception sensors 42 (for example, a pillar object with a plurality of reflection sections such as an H-beam).

Figure 10:
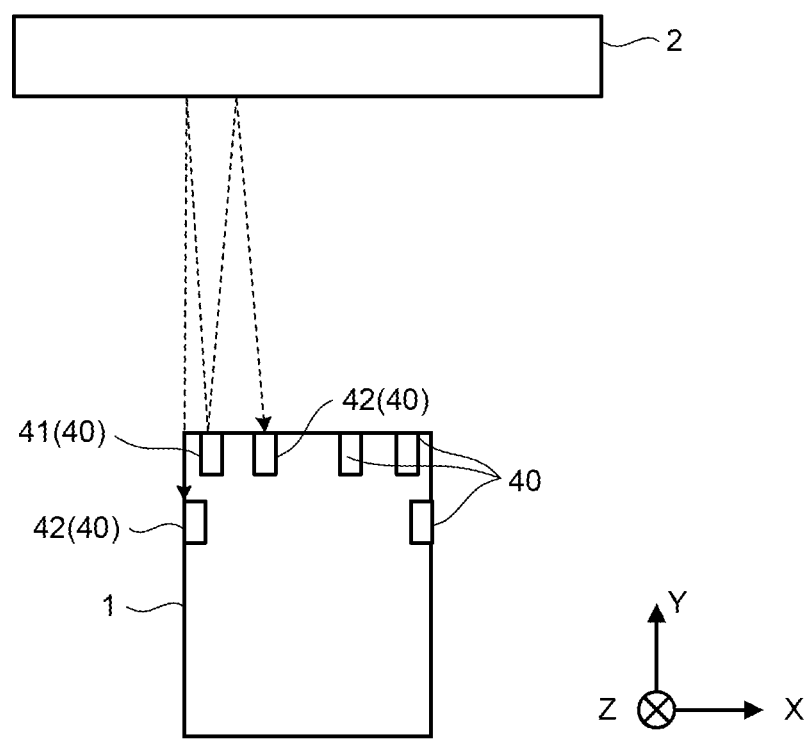
FIG. 10 illustrates another exemplary layout of the object detectors in the vehicle.

In the embodiment described above, object detector 40 is configured to include four sensors, but the present disclosure is not limited to this. Any number of sensors may be included as long as object detector 40 includes at least one wave transmission sensor and two wave reception sensors. For example, as illustrated in FIG. 10, object detector 40 includes six sensors including one wave transmission sensor 41 and two wave reception sensors 42.

Vehicle 1 is provided with six sensors: two in the middle section in direction X, one each on both ends in direction X, and one each on both sides of vehicle 1. In the example illustrated in FIG. 10, wave transmission sensor 41 is provided on the negative end in direction X. Additionally, in the example illustrated in FIG. 10, two wave reception sensors 42 are provided: one on the negative side of the two in the middle section in direction X, and one on the negative side of vehicle 1 in direction X. Assuming a case where detection waves are received by sensors on both sides of wave transmission sensors, two sensors in the middle section in direction X can be configured to be wave transmission sensors in the configuration with four sensors included in object detector 40 as illustrated in FIG. 2. Meanwhile, in the configuration with six sensors included in object detector 40, two sensors in the middle section in direction X and two sensors on both ends in direction X (that is, four sensors) can be configured to be wave transmission sensors, thereby increasing variations of the combinations of the wave transmission sensor and the wave reception sensor compared to the configuration illustrated in FIG. 2.

In the embodiment described above, the identification sensitivity is changed when a detection wave is reflected at two points of an object and received by vehicle 1, but the present disclosure is not limited to this. The identification sensitivity may be changed when a detection wave is reflected at three or more points of an object and received by vehicle 1. This case is possible when three or more wave reception sensors are provided.

Vehicle 1 includes a shape determiner in the embodiment described above, but the present disclosure is not limited to this. Vehicle 1 need not include a shape determiner as long as it is possible to externally acquire information on two sets of coordinates and/or information on the shape of an object.

In the embodiment described above, the identification control is performed when detection waves are received by two wave reception sensors, but the present disclosure is not limited to this. When a detection wave is received by only one wave reception sensor, an object may be identified by setting the identification threshold to the first threshold for a non-pillar object.

In the embodiment described above, an object identification apparatus (identifier, shape determiner, and changer) is incorporated into a vehicle control unit, but the present disclosure is not limited to this, and the object identification apparatus need not be incorporated into a vehicle control unit.

The embodiments above are merely examples in implementing the present disclosure, and the technical scope of the present disclosure should not be construed in a limitative sense due to the examples. That is, the present disclosure can be implemented in various forms without departing from the spirit and the main features thereof.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2021-051238, filed on Mar. 25, 2021, the disclosure of which including the specification, drawings and abstract is incorporated herein by reference in its entirety.

INDUSTRIAL APPLICABILITY

An object identification apparatus of the present disclosure is useful as an object identification apparatus, a vehicle, and an object identification method each capable of stably identifying an object.

The invention claimed is:

1. An object identification apparatus, comprising:
a processor, which in operation, identifies whether an object is a control target based on a result of comparison between reflection intensity of a detection wave transmitted from a moving body to the object and an identification threshold when the detection wave is reflected by the object and received by the moving body, wherein,
the processor determines the object is a pillar object having a circumferential surface according to positions of at least two points of the object when the detection wave is reflected at the at least two points and received by the moving body, and changes an identification sensitivity in response to the object being the pillar object.

2. The object identification apparatus according to claim 1, wherein, the processor:
determines a shape of the object based on a plurality of sets of coordinates of the object calculated by detecting a plurality of the detection waves respectively propagated in different routes, and
changes the identification sensitivity according to the plurality of sets of coordinates.

3. The object identification apparatus according to claim 1, wherein the identification threshold is set according to the reflection intensity of the detection wave for a non-control target, which is not the control target, when distance between the at least two points is equal to or greater than a predetermined threshold.

4. The object identification apparatus according to claim 3, wherein the non-control target is a lower object that is located on a road surface and has a height not causing collision with a body of the moving body.

5. The object identification apparatus according to claim 1, wherein the processor changes the identification sensitivity by changing the identification threshold.

6. The object identification apparatus according to claim 1, wherein the processor changes the identification sensitivity by changing the reflection intensity.

7. The object identification apparatus according to claim 1, wherein the processor performs control of changing the identification sensitivity according to distance between the moving body and the object.

8. The object identification apparatus according to claim 2, wherein the identification threshold is set according to the reflection intensity of the detection wave for a non-control target, which is not the control target, when distance between the at least two points is equal to or greater than a predetermined threshold.

9. The object identification apparatus according to claim 1, wherein the identification threshold is set according to the reflection intensity of the detection wave for a non-control target, which is not the control target, when distance between the at least two points is equal to or greater than a predetermined threshold.

10. The object identification apparatus according to claim 8, wherein the non-control target is a lower object that is located on a road surface and has a height not causing collision with a body of the moving body.

11. The object identification apparatus according to claim 9, wherein the non-control target is a lower object that is located on a road surface and has a height not causing collision with a body of the moving body.

12. The object identification apparatus according to claim 2, wherein the processor changes the identification sensitivity by changing the identification threshold.

13. The object identification apparatus according to claim 3, wherein the processor changes the identification sensitivity by changing the identification threshold.

14. The object identification apparatus according to claim 4, wherein the processor changes the identification sensitivity by changing the identification threshold.

15. The object identification apparatus according to claim 2, wherein the processor changes the identification sensitivity by changing the reflection intensity.

16. A system, comprising:
a processor, which in operation, identifies whether an object is a control target based on a result of comparison between reflection intensity of a detection wave transmitted from a moving body to the object and an identification threshold when the detection wave is reflected by the object and received by the moving body, wherein,
the processor determines the object is a pillar object having a circumferential surface according to positions of at least two points of the object when the detection wave is reflected at the at least two points and received by the moving body, and changes an identification sensitivity in response to the object being the pillar object;
a wave transmission sensor, which in operation, transmits the detection wave; and
at least two wave reception sensors, which in operation, receive the detection wave.

17. An object identification method, comprising:
identifying whether an object is a control target based on a result of comparison between reflection intensity of a detection wave transmitted from a moving body to the object and an identification threshold when the detection wave is reflected by the object and received by the moving body, wherein
the identifying includes determining the object is a pillar object having a circumferential surface according to positions of at least two points of the object when the detection wave is reflected at the at least two points and received by the moving body, and changing an identification sensitivity in response to the object being the pillar object.

* * * * *